May 13, 1969

G. E. HORECZKY 3,444,384

MOTION SELECTOR USING RATIO OF RESPONSES
OF TWO PHOTOELECTRIC CELLS

Filed Nov. 7, 1966

INVENTOR.
GEZA E. HORECZKY
BY Angus & Mon
ATTORNEYS.

United States Patent Office
3,444,384
Patented May 13, 1969

3,444,384
MOTION SELECTOR USING RATIO OF RESPONSES OF TWO PHOTOELECTRIC CELLS

Geza E. Horeczky, 661 Via Santa Ynez, Pacific Palisades, Calif. 90272

Filed Nov. 7, 1966, Ser. No. 592,407
Int. Cl. H01j *39/12*
U.S. Cl. 250—221 12 Claims

ABSTRACT OF THE DISCLOSURE

This invention relates to circuitry and associated apparatus for detecting changes in conditions in a field of observation. A sensor having a plurality of radiation-responsive members responds to a change in the ratio of radiation impinging on the radiation-responsive members and controls associated circuitry to operate a load device. Focusing means is provided for defining the field of observation from which radiation may impinge the sensor, whereby when an object moves through the field of observation a change in the ratio of the impinging radiation on the radiation-responsive members occurs. The circuitry includes a discriminator circuit which responds to a change in the ratio of the electrical characteristics of the radiation-responsive members to produce an output signal. The circuitry is impervious to changes in ambient radiation which do not affect the ratio of electrical characteristics of the radiation-responsive members, such as might be caused by nightfall. A phase inverter may be provided to invert output signals of one polarity from the discriminator circuit so that all output signals are of like polarity. A switching means may be provided for controlling suitable indicating and/or control devices.

Figure 1:
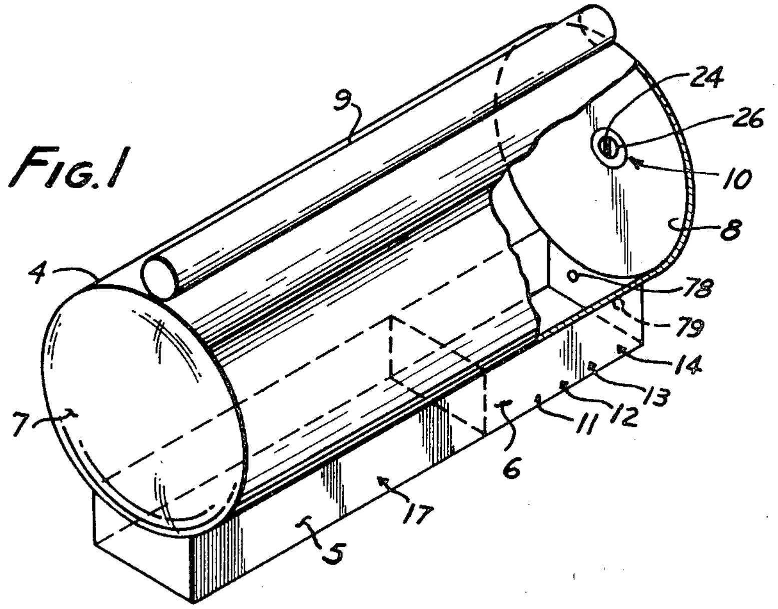

This invention relates to detectors sensitive to changes in field conditions, such as motion in a previously stable field.

An object of this invention is to provide a detector which senses a change in field conditions, such as movement in a previously stabilized field of observation to produce a signal which can be utilized to indicate the fact of motion and, if desired, respond thereto. Examples of indicators which may be used with the present invention are visual alarms, audible alarms, radio transmitters and counters. One example of a controller which may be used with the present invention is a traffic signal.

Another object of this invention is to provide a detector whose installation amounts to no more than placing the detector in position. Secondary units such as light beam emitters or the like are not required and there is no reliance on physical contact of any kind with the detector for its operation.

Still another object of this invention is to provide a detector having a field of observation which can vary in intensity, without actuating the device, thereby rendering the device useful in fields wherein the general intensity may vary suddenly and severely.

An optional and desirable object of this invention is to provide a detector which is small in size, economical, self-contained and which has a negligible power consumptiton in its quiescent state. The detector is left unattended after being emplaced, and operates over long periods of time without maintenance or service. The electronic circuitry may, if desired, utilize solid state devices. The detector need have no moving parts.

While the device is capable of assuming many shapes, one suitable shape is that of a small photographic camera. Depending on location, the movement detector may be battery powered and thereby self-contained or connected to a power supply line or even involve a combination of both.

A motion detector of the present type is useful in a wide number of applications. It may, for example, be utilized as an intrusion detector for detecting the entry or motion of unauthorized persons or objects in an area under observation and may control suitable indicating and/or warning circuitry to notify suitable personnel, such as guards, police, etc. of the intrusion. It may even be utilized as a counter of persons or objects moving through an area to determine the number of persons or objects passing therethrough, or in traffic control to sense the approach to a vehicle toward an intersection and thereby control suitable traffic signalling circuitry. It may also be utilized for detecting the approach of railroad trains toward a crossing (by distinguishing a moving train from a parked train), moving planes at a congested airport, both grounded and airborne, and controlling moving vehicles of all types such as automobiles, trucks of all sizes and even bicycles.

As an extension of the function of sensing the presence of a moving vehicle, two or more such detectors spaced a known distance apart may be utilized for measuring traffic speed and/or traffic density (or congestion).

A detector according to this invention includes a sensor means having a plurality of radiation-responsive members. Focusing means is provided for defining the field of observation from which radiation may impinge upon the sensing means. A circuit, responsive to change in radiation on the radiation-responsive members, adapts itself to the quiescent condition where it is installed, and thereafter detects relative changes in radiation intensity between the radiation-responsive members; that is, changes which affect a ratio of the electrical characteristics of the radiation-responsive members. When the radiation in the total diminished in absolute intensity, such as when night falls, the ratio of the electrical characteristics between the radiation-responsive members does not change, and the detector will not be actuated.

The detector may be installed to view a random field, and no special effect need be taken to maintain a field with a uniform radiation during quiescent periods. Quiescence may be achieved when multiple degrees of radiation from multiple areas in the field of observation are directed toward the sensor.

According to a preferred but optional feature of this invention, a switching means is operated by the circuit for controlling a suitable indicating and/or control device.

Figure 2:
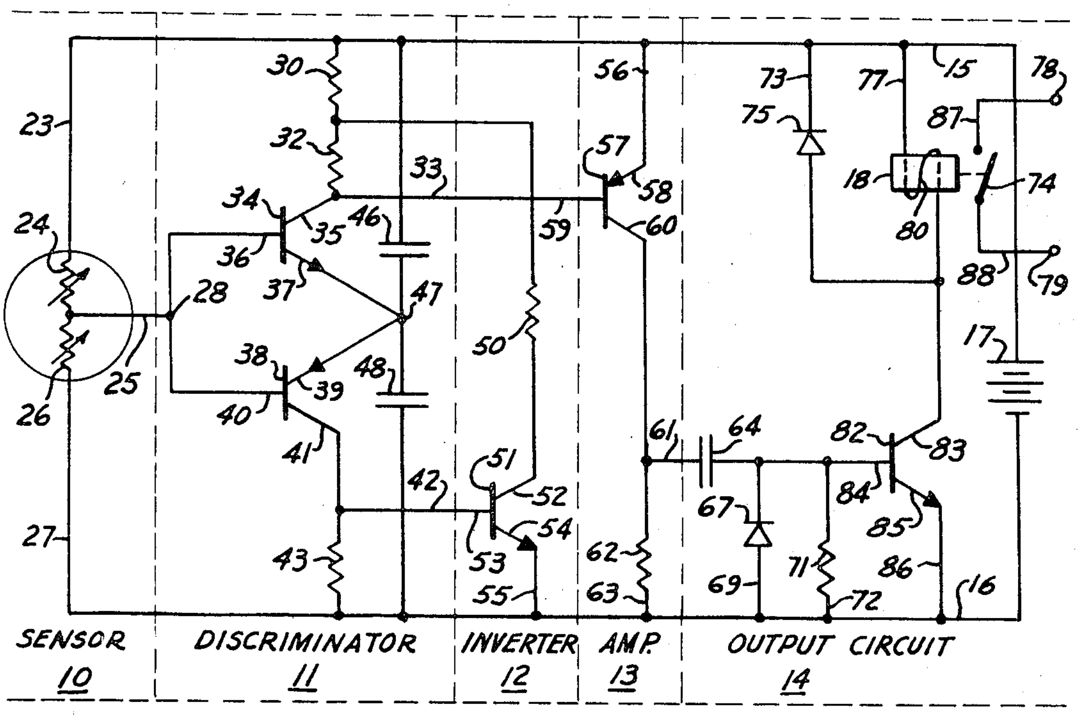

The above and other features of this invention will be fully understood from the following detailed description and the accompanying drawings, in which:

FIG. 1 is a perspective illustration, partly in cutaway cross-section of a detector according to the present invention; and FIG. 2 is a circuit diagram of a preferred circuit for use with the sensor and detector of FIG. 1.

Referring to FIG. 1, there is illustrated the preferred embodiment of a motion detector having a cylindrical housing 4. Housing 4 has a battery compartment 5 for housing a battery 17. A second compartment 6 is provided for housing electronic circuitry, 11, 12, 13 and 14, to be hereinafter described. A pair of output terminals 78 and 79 are fixed to one wall of compartment 6. Housing 4 includes a forward end 7 and a rear end 8. Forward end 7 may be open, or may be closed with a suitable transparent shield to prevent dust or other foreign matter from entering the housing 4. Preferably, end 7 is provided with an objective lens for focusing images upon rear end wall 8.

Rear end wall 8 carries a sensor 10 having a pair of radiation-responsive members 24 and 26. A view finder 9 is mounted to housing 4 to facilitate the proper aiming of housing 4 at a field of observation to be viewed by the motion detector.

When housing 4 has been properly positioned so as to be responsive to motion within a desired field, radiation from objects in the field of observation is cast upon the lens at the front end 7 of housing 4. The radiation from an object within the field of observation may be either reflected radiation or radiated radiation. Lens 7 casts an image upon wall 8 at the rear end of housing 4.

As an object moves through the field under observation the image cast by the object moves across wall 8 and one of the radiation-responsive members 24 or 26. The circuit contained in compartment 6 and illustrated in greater detail in FIG. 2 responds to changes in the ratio of incident radiation on the radiation-responsive members. An object having an image moving across both radiation-responsive members may initially cause an increase in incident radiation on one of the members, followed by an increase in incident radiation on the other member, accompanied by a corresponding decrease in incident radiation on the first member. The circuit in compartment 6 is responsive to these changes.

The lens is preferably constructed so that images are sharp only for objects which are an infinite distance away. Blurred images, due to closely-oriented objects, do not curtail the function of the detector and are readily sensed.

Should the incident radiation change equally on both radiation-responsive members 24 and 26 so as not to alter the ratio of radiation on them, such as might be caused by night fall, the circuit illustrated in FIG. 2 will not be actuated thus preventing a false actuation.

FIG. 2 illustrates a preferred circuit for use with the present invention comprising sensor 10, discriminator 11, phase inverter 12, amplifier 13 and output circuit 14. Battery 17 is provided for supplying sufficient energy to the circuit of FIG. 2 through positive lead 15 and negative lead 16.

It is understood that battery 17 may be replaced by a suitable connection to a line source and D.C. converter for more permanent installations. It is further understood that a suitable battery charging D.C. line supply may be utilized for charging battery 17 and supplying to the circuit of FIG. 2 sufficient energy for operation. With the latter arrangement, battery 17 may be utilized in case of power failure from the line supply.

Sensor 10 comprises radiation-responsive members 24 and 26 which may be photocells or infrared sensors. Member 24 is connected by lead 23 to lead 15, and member 26 is connected by lead 27 to lead 16. Lead 25 is connected to the junction between members 24 and 26 and to reference junction 28. Reference junction 28 provides a reference voltage level for actuation of the entire circuit.

In the quiescent state, that is, when there is no change in the ratio of the radiation levels, the two radiation-responsive members 24 and 26 will each assume a resistance value corresponding to the incident radiation level and provide a steady state voltage at reference junction 28. Members 24 and 26 act as a voltage divider between leads 15 and 16 having a ratio of resistance determined by the incident radiation. If the incident radiation is the same on both members 24 and 26, the resistance of both members is approximately the same and the voltage at reference junction 28 is approximately one half the battery voltage. If the incident radiation is different on the two members, the reference voltage is at a value dependent upon the ratio of resistances. This condition exists regardless of what the actual resistance of members 24 and 26 may be, and regardless of what the luminous intensity or incident radiation may be. The sensors may have low resistance by virtue of a high incident radiation, or they may have a high resistance due to low incident intensity. As long as the ratio of resistances of members 24 and 26 do not change, the voltage at reference junction 28 remains at the same level. Therefore, it is not necessary to maintain a uniform field of observation during the quiescent state. However, if the incident radiation on one of members 24 or 26 changes, the voltage at reference junction 28 will assume a different value as compared to the voltage level in the quiescent state. The activation of the present circuit depends solely upon the change in incident radiation intensity upon member 24 or 26 and a corresponding change in the ratio of their resistances. When a change in incident radiation intensity occurs on one of the members, the ratio is altered and the voltage level at reference junction 28 will change, thereby providing a signal effective to trigger the remainder of the circuit.

A discriminator circuit 11 is provided which is responsive to changes in voltage levels at reference junction 28. The discriminator circuit includes NPN transistor 34 having a collector 35, a base 36 and an emitter 37. The discriminator circuit also includes PNP transistor 38 having an emitter 39, a base 40 and a collector 41. Base 36 of transistor 34 and the base 40 of transistor 38 are connected together and to reference junction 28. Emitter 37 of transistor 34 and emitter 39 of transistor 38 are joined at reference junction 47. Reference junction 47 is also connected to one side of capacitor 46. The opposite side of capacitor 46 is connected to positive lead 15. Also connected to reference junction 47 is one side of capacitor 48. The opposite side of capacitor 48 is connected to negative lead 16. Capacitors 46 and 48 are of equal capacity so as to form a voltage divider between the battery leads 15 and 16.

Radiation-responsive members 24 and 26 form a bridge network with capacitors 46 and 48 so that one of the transistors 34 and 38 conducts upon unbalancing the bridge network.

Collector 35 of transistor 34 is connected to output lead 33 and to one side of resistor 32. The opposite side of resistor 32 is connected to one side of resistor 30. The other side of resistor 30 is connected to positive lead 15. The series connection of resistors 32 and 30 provide the load resistance for transistor 34. The collector 41 of transistor 38 is connected to output lead 42 and to one side of resistor 43. The opposite side of resistor 43 is connected to negative lead 16. Resistor 43 represents the load resistance for transistor 38.

A phase inverter 12 is provided capable of receiving a signal from one output of discriminator 11. Phase inverter 12 includes PNP transistor 51 having a collector 52, base 53 and emitter 54. Base 53 of transistor 51 is connected to output lead 42 of the discriminator circuit.

Emitter 54 of transistor 51 is connected by lead 55 to negative lead 16. Collector 52 of transistor 51 is connected to one side of resistor 50. The other side of resistor 50 is connected to the junction between resistors 30 and 32. Resistors 30 and 50 represent the load resistance for transistor 51.

Amplifier circuit 13 consists of PNP transistor 57 having a base 59 connected to output lead 33 of the discriminator. Emitter 58 of the transistor 57 is connected by lead 56 to positive lead 15. Collector 68 of transistor 57 is connected to one side of resistor 62 and to output lead 61. The other side of resistor 62 is connected by lead 63 to negative lead 16. Resistor 62 forms the load resistor for transistor 57. The function of the amplifier circuit 31 is to provide a signal at output lead 61 large enough to drive the output circuit 14, thence energizing the relay 18.

The output circuit comprises NPN transistor switch 82 having an emitter 85 connected by lead 86 to negative lead 16. Base 84 of transistor 82 is connected to one side of resistor 71. The other side of resistor 71 is connected by lead 72 to negative lead 16. Base 84 of transistor 82 is also connected to the cathode of diode 67. The anode of diode 67 is connected by lead 69 to negative lead 16. Capacitor 64 is connected between output lead 61 from amplifier 13 and base 84 of transistor 82. Collector 83 of transistor 82 is connected to one side of coil 80 of the relay 18. The other side of coil 80 is connected by lead 77 to positive lead 15. Connected across coil 80 of relay 18 is diode 75, having its cathode connected to positive lead 15 by lead 73 and its anode connected to the junction between collector 83 and coil 80.

Relay 18 has a set of contacts 74 connected to the output terminals 78 and 79 by leads 87 and 88, respectively. Although any type of contact arrangement may be used, a relay with one set of normally-open contacts is illustrated. It is a function of the set of contacts to operate any desired external control circuitry, such as an audio and/or visual alarm, a counter, an actuator, a radio transmitter or any other device whose operation depends on completing an incomplete circuit or interrupting a complete circuit.

The operation of the entire circuit will now be described. Assuming that the circuit is in the quiescent state, that no change in the ratio of incident radiation on the sensor reference members 24 and 26 has occurred, and that capacitors 46 and 48 are charged, transistors 34, 38, 51, 57 and 82 are in the cut-off or non-conductive state. No current except for a very small leakage current, is flowing through any circuitry associated with the transistors, and relay 18 is de-energized. A small current does flow from battery through sensor members 24 and 26. The magnitude of the current through the sensor members is determined by the parameters of sensor members 24 and 26 and the magnitude of incident radiation upon each of sensor members 24 and 26. The sensor current is preferably kept very small so as not to drain battery 17 to any appreciable extent.

Reference junction 28 will have established a potential, the value of which is dependent upon the ratio of the resistances of members 24 and 26 caused by the voltage dividing effect of sensor members 24 and 26. Reference junction 47 also has reached an established potential, the value of which is due to the voltage dividing effect of capacitors 46 and 48.

In the quiescent state, both reference junctions 28 and 47 have essentially the same voltage. The bridge network formed by capacitors 46 and 48 and sensor members 24 and 26 is therefore balanced.

Assuming now that a decrease of incident radiation occurs on sensor member 24 due to a movement of a body in the field of observation of the detector, the resistance of sensor member 24 increases in the case of photocells and the resistance of sensor member 26 remains unchanged. This effect alters the ratio of the electrical characteristics between the radiation-responsive members. The bridge network becomes unbalanced and the voltage at reference junction 28 will drop to a lower value due to the change in the ratio of the relative values of the resistances of members 24 and 26.

The reference junction 28 voltage is also lower than the voltage at reference junction 47. This has no effect on transistor 34, which is already in its non-conductive state. However, a negative bias appears at the base of transistor 38, causing transistor 38 to conduct. Current will flow from the battery through resistor 43, collector 41, emitter 39 to junction 47. Capacitor 46 will be additionally charged and the capacitor 48 will be somewhat discharged causing a current flow through load resistor 43. During the time of conduction of transistor 38, a positive signal appears on output lead 42 which is applied to the base of transistor 51 in phase inverter 12. When capacitor 46 has sufficiently charged and capacitor 48 has sufficiently discharged so that reference junction 47 has reached essentially the same voltage as reference junction 28, transistor 38 is no longer forward biased and returns again to its cut-off condition. Therefore, current flow through load resistor 43 ceases.

A similar change in the ratio of the resistance of members 24 and 26 will occur if sensor member 26 experiences an increase in incident radiation while sensor member 24 remains unchanged. The resistance of sensor member 26 decreases, causing a drop in voltage at reference junction 28, causing the discriminator circuit to operate as previously described.

Assuming that sensor member 24 experiences an increase in incident radiation with a corresponding resistance decrease, or that sensor member 26 experiences a decrease in incident radiation and a corresponding increase in resistance, the ratio of the resistances of members 24 and 26 changes causing the voltage at reference junction 28 to rise to a higher value. The voltage at reference junction 28 will be higher or more positive than the voltage at reference junction 47. This has no effect on transistor 38, which is already in its cut-off state, but transistor 34, now forward biased due to the positive voltage applied on its base, conducts, allowing current to flow from the battery through resistor 30, resistor 32, collector 35 and emitter 37 to reference junction 47. Capacitor 48 will be additionally charged and capacitor 46 will be somewhat discharged, causing a current flow through load resistors 30 and 32. During the time of conduction of transistor 34, a negative signal appears on output lead 33 which is applied to the base of transistor 51 in the amplifier. When capacitor 46 has sufficiently discharged and capacitor 48 has sufficiently charged so that reference junction 47 has reached essentially the same voltage as reference junction 28, transistor 34 is no longer forward biased and returns again to its cut-off state. Therefore, current flow through load resistors 30 and 32 ceases.

As described previously, the positive signal on lead 42 is applied to the base of transistor 51. The base of transistor 51 is forward biased during duration of the signal on lead 42 causing transistor 51 to conduct. Current flows from the battery through resistor 30, resistor 50, collector 52 and emitter 54. This current flow appears as a negative signal on the junction between resistors 30 and 32 and therefore biases the voltage on lead 33 negatively. By properly choosing the values of resistors 30 and 50, the signal on lead 33 due to phase inverter 12 may have approximately the same amplitude as the signal caused by the alternative operation of transistor 34.

The phase inverter circuit assures a negative signal to appear on lead 33 regardless of which sensor member 24 or 26 experiences an increase or decrease in incident radiation, or whether the ratio of resistances of members 24 and 26 increases or decreases. All changes in incident radiation magnitudes are detected without regard to which sensor member may detect the change. The signal duration upon detection of a change in the ratio of incident radiation on members 26 and 28 is determined by the time constants of capacitors 46 and 48 and either resistor 43 or the series resistors 30 and 32, depending upon which transistor 34 or 38 is actuated. These time constants are preferably made equal by properly choosing the values of the capacitors and resistors.

The negative signal on lead 33 is applied to the base of transistor 57 in amplifier 13. In the quiescent state, transistor 57 is zero-biased and therefore is cut-off. A signal on base 59 biases the transistor in the forward direction, causing current to flow from the battery through emitter 58, collector 60 and load resistor 62. The current flow through resistor 62 causes an amplified voltage to appear on lead 61. The signal voltage is used to operate the output circuit 14.

The signal on lead 61 is applied through capacitor 64 to base 84 of transistor 82. In the quiescent state, base 84 is zero-biased through resistor 71, lead 86 and negative lead 16. Transistor 62 is therefore in cut-off condition in the quiescent state. However, if a signal appears at base 84, transistor 82 is driven into saturation causing current to flow from the battery through lead 77, relay coil 80, collector 83, emitter 85 and lead 86 to negative lead 16. The relay will therefore be energized for the duration of the signal causing contacts 74 to close and actuate externally attached circuits or load devices, through leads 87 and 88 and terminals 78 and 79.

Diode 67 assures a rapid recovery of capacitor 64 after the signal ceases. The charged capacitor 64 can be discharged through lead 61, resistor 62, and diode 67.

Diode 75 eliminates dangerous transients at turn-off of the current flow through relay coil 80, by allowing transient voltages at relay coil 80 to be dissipated safely through diode 75.

For permanent installations, the battery may be of the re-chargeable type with a small charger circuit connected to the electrical power line, making it independent of power failures. In other permanent applications, the battery may be replaced by a small power supply connected to the power line. Normally, however, the system has its own battery in order to assure the greatest flexibility in application and independence of external power sources, and make its handling shock-hazard free and its setup as simple as possible.

As pointed out above, there is only negligible current draw during the quiescent state. Appreciable current draw occurs only during operation of the system, that is, during the period of time in which change in the ratio of incident radiation is detected. By choosing a battery of proper type and size with respect to the expected operation of the device for a given period of time, a long battery life may be assured.

The present invention provides a new and improved motion detector which can be moved about freely without special installations, has no restrictions in regard to the chosen field of observation, can be left entirely unattended for long periods of time, requires little maintenance or service, and is as simple to use as a flashlight or a simple photo camera. Since the detector derives its activation either from sunlight, artificial light, infrared or other radiation, it does not depend on any secondary unit as part of the system, nor is it therefore restricted to one observation path only. It can compare two separate fields derived from two separate lenses. The detector is simple, efficient and economical to manufacture.

It is understood that PNP transistors may be substituted for NPN transistors and that NPN transistors may be substituted for PNP transistors, when accompanied with other alterations of the circuit which are well known in the electronics fields.

This invention is not to be limited by the embodiment shown in the drawings and described in the description, which is given by way of example and not of limitation, but only in accordance with the scope of the appended claims.

I claim:

1. A motion detector for detecting movement of objects within an area, said detector comprising: sensing means having a pair of radiation-responsive members, each of said radiation-responsive members having an electrical characteristic adapted to change in value upon a change in incident radiation impinging the member, the relative values of said electrical characteristics of said pair of radiation-responsive members defining a ratio; focusing means for defining a field of observation from which radiation may impinge said sensing means; and an electrical circuit means connected to said sensing means, said electrical circuit means comprising a discriminator circuit connected to said radiation-responsive members and responsive to a change in the ratio of the electrical characteristics of said radiation-responsive member, said discriminator circuit including a first and a second output lead, said discriminator circuit being adapted to provide a first signal of first polarity at said first output lead in response to a change in one sense in the ratio of said electrical characteristics and being further adapted to provide a second signal of second polarity at said second output lead in response to a change in another sense in the ratio of said electrical characteristics, said other sense being opposite from said one sense, a phase inverter connected to said second output lead, said phase inverter being adapted to provide a third signal of said first polarity at said first output lead, and an electrical load connected to said first output lead and operable in response to the output signal at said first output lead.

2. A motion detector according to claim 1 wherein said radiation-responsive members are serially connected and a first junction is formed between said radiation-responsive members; said discriminator circuit further including a pair of serially-connected impedance means, a second junction between said pair of impedance means, a PNP transistor having a base, emitter and collector, an NPN transistor having a base, emitter and collector, means connecting the bases of said transistors together and to said first junction between said radiation-responsive members, means connecting the emitters of said transistors together and to said second junction between said impedance means, means connecting one of the collectors to said first output lead, and means connecting the other of said collectors to said second output lead.

3. A motion detector according to claim 2 wherein each of said impedance means is a capacitor.

4. A motion detector according to claim 2 wherein said electrical characteristic is resistance.

5. A motion detector according to claim 2 further including switching means operable by said output signal from said discriminator circuit.

6. A motion detector according to claim 2 further including a housing, means mounting said sensor to said housing, means mounting said focusing means to said housing, and a view finder mounted to said housing for locating the field of observation.

7. A motion detector according to claim 6 wherein said housing includes a compartment means for said electrical circuit means.

8. A motion detector according to claim 7 wherein said focusing means is an objective lens.

9. A motion detector according to claim 2 further including a housing, means mounting said sensor to said housing, means mounting said focusing means to said housing, and a view finder mounted to said housing for locating the field of observation.

10. A motion detector according to claim 9 wherein said housing includes compartment means for said electrical circuit means.

11. A motion detector according to claim 10 further including switching means connected to said first output lead and operable by one of said first and third signals, and output terminals mounted to said housing and connected to said switching means, said terminals being adapted to be connected to the electrical load to actuate the same upon operation of said switching means.

12. A motion detector according to claim 1 wherein said focusing means is an objective lens.

References Cited

UNITED STATES PATENTS

| | | | |
|---|---|---|---|
| 2,424,193 | 7/1947 | Rostet et al. | 250—204 |
| 3,191,048 | 6/1965 | Cowen | 250—221 |

RALPH G. NILSON, *Primary Examiner.*

MARTIN ABRAMSON, *Assistant Examiner.*

U.S. Cl. X.R.

250—204, 209, 214

UNITED STATES PATENT OFFICE
CERTIFICATE OF CORRECTION

Patent No. 3,444,384 May 13, 1969

Geza E. Horeczky

It is certified that error appears in the above identified patent and that said Letters Patent are hereby corrected as shown below:

Column 1, line 13, "invention" should read -- disclosure --; line 29, "nightfall" should read -- night fall --. Column 4, line 59, "68" should read -- 60 --. Column 6, line 64, "The" should read -- This --. Column 7, line 46, "fields" should read -- field --. Column 8, line 43, the claim reference numeral "2" should read -- 1 --.

Signed and sealed this 24th day of March 1970.

(SEAL)
Attest:

Edward M. Fletcher, Jr.
Attesting Officer

WILLIAM E. SCHUYLER, JR.
Commissioner of Patents